United States Patent
Banhos et al.

(10) Patent No.: US 12,078,081 B1
(45) Date of Patent: Sep. 3, 2024

(54) AIRFOIL WITH CMC PLY CUTOUTS FOR COOLING CHANNELS

(71) Applicant: RAYTHEON TECHNOLOGIES CORPORATION, Farmington, CT (US)

(72) Inventors: Jonas Banhos, West Hartford, CT (US); Russell Kim, Temecula, CA (US); James T. Roach, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/195,149

(22) Filed: May 9, 2023

(51) Int. Cl.
 *F01D 5/28* (2006.01)
 *F01D 5/18* (2006.01)
 *C04B 35/80* (2006.01)

(52) U.S. Cl.
 CPC ............ *F01D 5/284* (2013.01); *F01D 5/187* (2013.01); *F01D 5/282* (2013.01); *C04B 35/80* (2013.01); *F05D 2300/6033* (2013.01)

(58) Field of Classification Search
 CPC .......... F01D 5/187; F01D 5/284; F01D 5/282; F05D 2300/6033
 See application file for complete search history.

(56) References Cited

U.S. PATENT DOCUMENTS

| | | | |
|---|---|---|---|
| 6,746,755 B2 * | 6/2004 | Morrison | B32B 3/18 428/188 |
| 7,413,406 B2 * | 8/2008 | Pietraszkiewicz | F01D 5/186 416/97 R |
| 10,626,735 B2 * | 4/2020 | Whitfield | F01D 5/187 |
| 11,047,240 B2 * | 6/2021 | Frey | C04B 35/14 |
| 11,236,629 B2 | 2/2022 | Kusumoto et al. | |
| 11,326,470 B2 | 5/2022 | Dyson et al. | |
| 2018/0223681 A1 | 8/2018 | Gallier et al. | |
| 2021/0189886 A1 * | 6/2021 | Dyson | F01D 5/282 |

\* cited by examiner

*Primary Examiner* — Michael L Sehn
(74) *Attorney, Agent, or Firm* — Carlson, Gaskey & Olds, P.C.

(57) ABSTRACT

An airfoil includes an airfoil wall that circumscribes a main cavity and defines radially inner and outer ends, leading and trailing edges, and pressure and suction sides. The airfoil wall includes a lay-up of ceramic matrix composite (CMC) plies that span the radially inner and outer ends and have an inner-most CMC ply bounding at least a portion of the main cavity, an exterior skin CMC ply, and intermediate CMC plies between the inner-most CMC ply and the exterior skin CMC ply. At least one of the intermediate CMC plies has cutout voids that define cooling channels in the airfoil wall. The cooling channels are bound on lateral sides by the at least one of the intermediate CMC plies, bound on an inner side by a first adjacent one of the CMC plies, and bound on an outer side by a second, different adjacent one of the CMC plies.

18 Claims, 5 Drawing Sheets

(a)

(b)

(c)

(d)

(e)

(g)

(f)

(h)

AIRFOIL WITH CMC PLY CUTOUTS FOR COOLING CHANNELS

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil wall that circumscribes a main cavity and defines radially inner and outer ends, leading and trailing edges, and pressure and suction sides. The airfoil wall includes a lay-up of ceramic matrix composite (CMC) plies that span the radially inner and outer ends and have an inner-most CMC ply that bounds at least a portion of the main cavity, an exterior skin CMC ply, and intermediate CMC plies between the inner-most CMC ply and the exterior skin CMC ply. At least one of the intermediate CMC plies has cutout voids that define cooling channels in the airfoil wall. The cooling channels are bound on lateral channel sides by the at least one of the intermediate CMC plies, bound on an inner channel side by a first adjacent one of the CMC plies, and bound on an outer channel side by a second, different adjacent one of the CMC plies.

In a further embodiment of the foregoing example, multiple ones of the intermediate CMC plies have the cutout voids such that the cooling channels form a three-dimensional cooling network.

In a further embodiment of any of the foregoing examples, multiple ones of the intermediate CMC plies have the cutout voids and the cooling channels are non-interconnected.

In a further embodiment of any of the foregoing examples, multiple ones of the intermediate CMC plies have the cutout voids and the cooling channels are interconnected.

In a further embodiment of any of the foregoing examples, the cooling channels are tapered along a radial direction.

In a further embodiment of any of the foregoing examples, two or more congruent ones of the intermediate CMC plies have the cutout voids such that the cooling channels have a thickness that is equal to two or more of the CMC plies.

In a further embodiment of any of the foregoing examples, the cooling channels have a thickness and the CMC plies each have a ply thickness, and the thickness of the cooling channels is a multiple of the ply thickness.

In a further embodiment of any of the foregoing examples, the cooling channels are located in the pressure side, the suction side, and the leading edge.

In a further embodiment of any of the foregoing examples, the cooling channels are radially elongated.

In a further embodiment of any of the foregoing examples, multiple ones of the intermediate CMC plies have cutout voids, and the cooling channels align in columns in a thickness direction through the airfoil wall.

In a further embodiment of any of the foregoing examples, multiple ones of the intermediate CMC plies have cutout voids, and the cooling channels are staggered in a thickness direction through the airfoil wall.

In a further embodiment of any of the foregoing examples, the inner-most CMC ply includes at least one inlet hole connecting the cooling channels with the main cavity.

In a further embodiment of any of the foregoing examples, the exterior skin CMC ply includes at least one outlet hole connected with the cooling channels.

In a further embodiment of any of the foregoing examples, the cooling channels are uniformly spaced apart.

In a further embodiment of any of the foregoing examples, the cooling channels are non-uniformly spaced apart.

A gas turbine engine according to an example of the present disclosure includes a compressor section, a combustor in fluid communication with the compressor section, and a turbine section in fluid communication with the combustor. The turbine section has a plurality of airfoils as in any of the foregoing embodiments.

A method of fabricating an airfoil according to an example of the present disclosure includes laying-up at least one inner-most ceramic fabric ply around a mandrel, laying-up the at least one discontinuous intermediate ceramic fabric ply on the at least one inner-most ceramic fabric ply, the at least one discontinuous intermediate ceramic fabric ply having cutout voids, laying-up at least one exterior skin ceramic fabric ply on the at least one discontinuous intermediate ceramic fabric ply with the cutout voids, the inner-most ceramic fabric ply, the at least one discontinuous intermediate ceramic fabric ply, and the exterior skin ceramic fabric ply together providing an airfoil fiber preform, and densifying the airfoil fiber preform with a ceramic matrix material to form an airfoil wall of an airfoil, wherein the cutout voids define cooling channels in the airfoil wall.

A further embodiment of the foregoing example includes cutting strips in at least one ceramic fabric ply to provide the at least one discontinuous intermediate ceramic fabric ply, and removing the strips from the at least one discontinuous intermediate ceramic fabric ply to provide the cutout voids.

A further embodiment of the foregoing example includes laying-up strips of ceramic fabric on the at least one inner-most ceramic fabric ply to provide the at least one discontinuous intermediate ceramic fabric ply.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
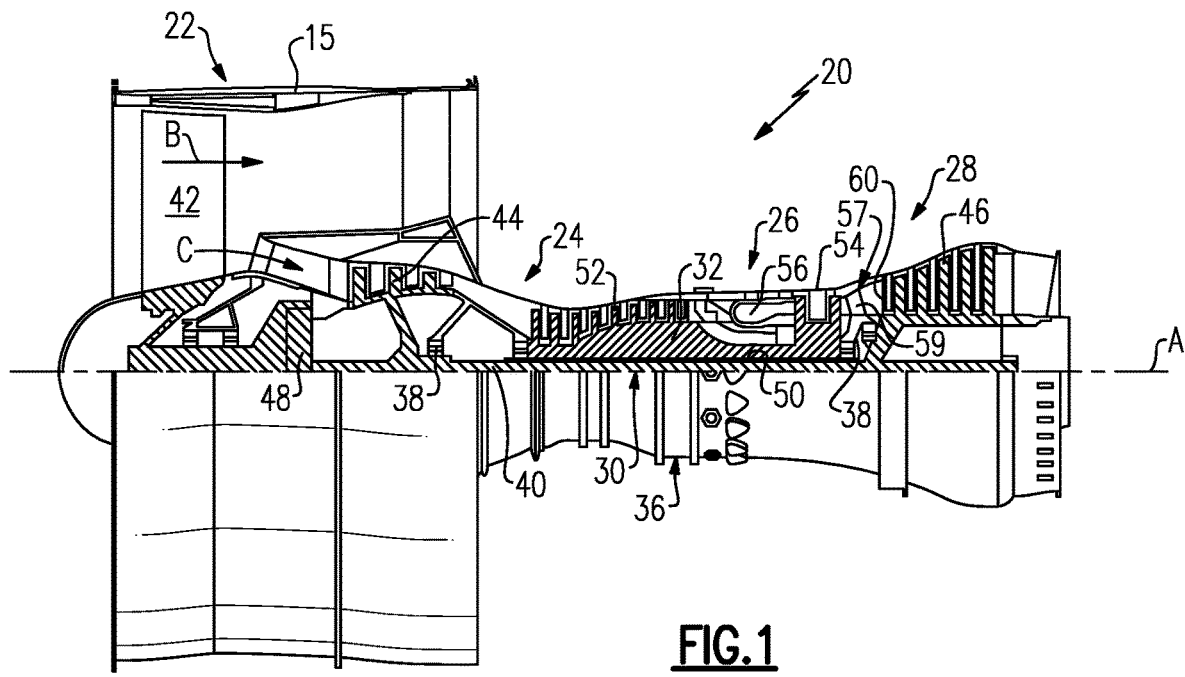
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
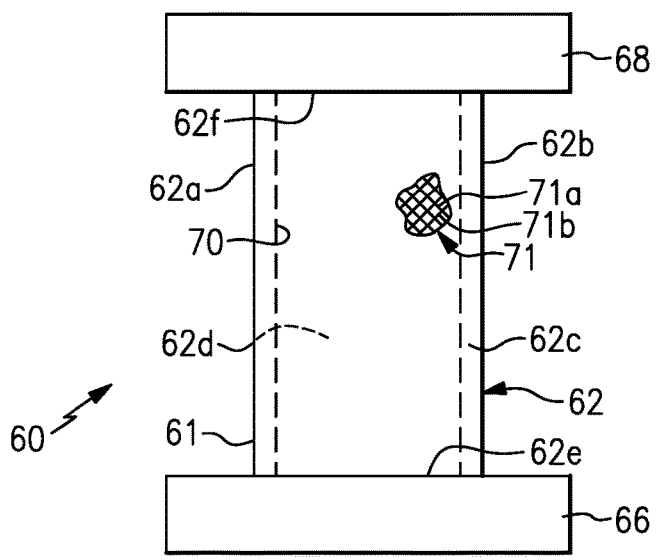
FIG. 2 illustrates an airfoil from the turbine section of the engine.

FIG. 2 illustrates an example airfoil 60 from the turbine section 28 of the engine 20 (see also FIG. 1). For instance, the airfoil 60 is a vane that is supported between inner and outer support hardware and there are multiple airfoils 60 arranged in a circumferential row in the engine 20. It is to be understood that although the examples herein may be shown in context of a vane from the turbine section 28, the examples can be applied to turbine blades or other types of airfoils in other portions of the engine 20.

In the illustrated example, the airfoil 60 is comprised of an airfoil wall 61 that defines an airfoil section 62. The airfoil section 62 extends between (radially) inner and outer platforms 66/68, which may be integrally formed with the airfoil section 62. It is to be understood, however, that vane designs vary and that some designs may have a single platform or no platforms. The airfoil section 62 circumscribes an internal main cavity 70 and defines leading and trailing edges 62a/62b and first and second sides 62c/62d that join the leading and trailing edges 62a/62b. In this example, the first side 62c is a pressure side and the second side 62d is a suction side. The airfoil section 62 spans radially, relative to the central engine axis A, between a first (inner) radial end 62e to a second (outer) radial end 62f. The terms "first" and "second" as used herein are to differentiate that there are two architecturally distinct components or features. It is to be further understood that the terms "first" and "second" are interchangeable in the embodiments herein in that a first component or feature could alternatively be termed as the second component or feature, and vice versa.

The airfoil 60 is formed of a ceramic matrix composite (CMC) 71 (shown in partial cutaway view). For example, the CMC 71 includes ceramic fiber tows 71a that are disposed in a ceramic matrix 71b. The CMC 71 may be, but is not limited to, a SiC/SiC ceramic matrix composite in which SiC fiber tows are disposed within a SiC matrix. The fiber tows are provided in a ceramic fabric and arranged in a fiber architecture in the fabric (e.g. braided or harness satin weave). As will be described in further detail later on below, the fabric is laid-up, fabric layer upon fabric layer, to provide the airfoil wall 61.

Figure 3A:
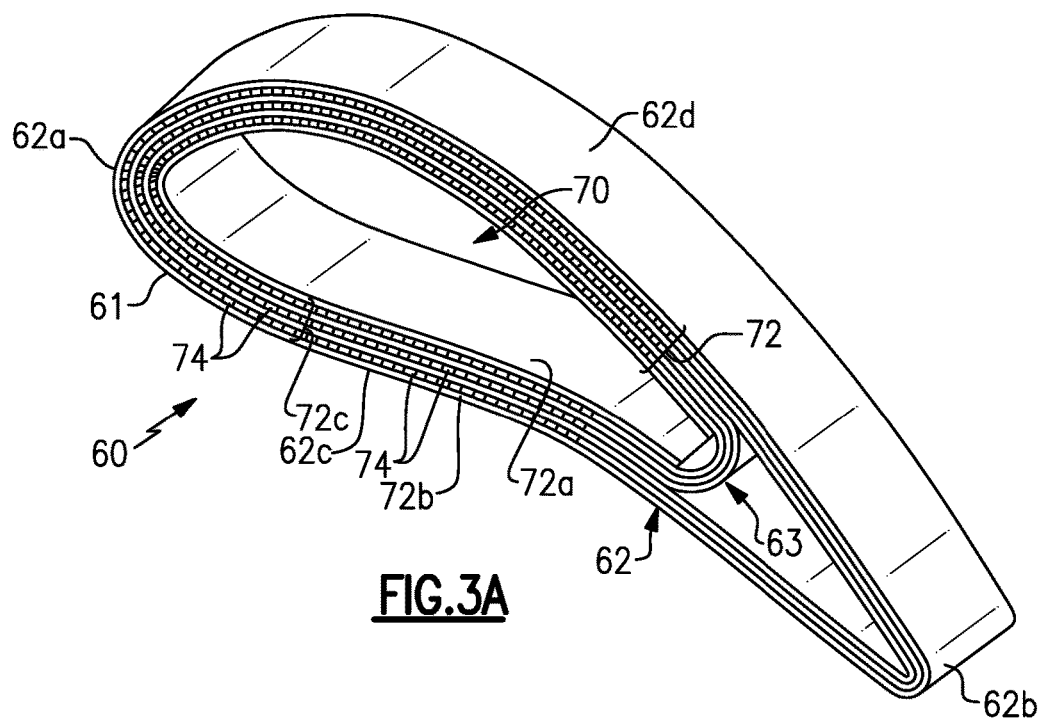
FIG. 3A illustrates a sectioned view of an airfoil.
Figure 3B:
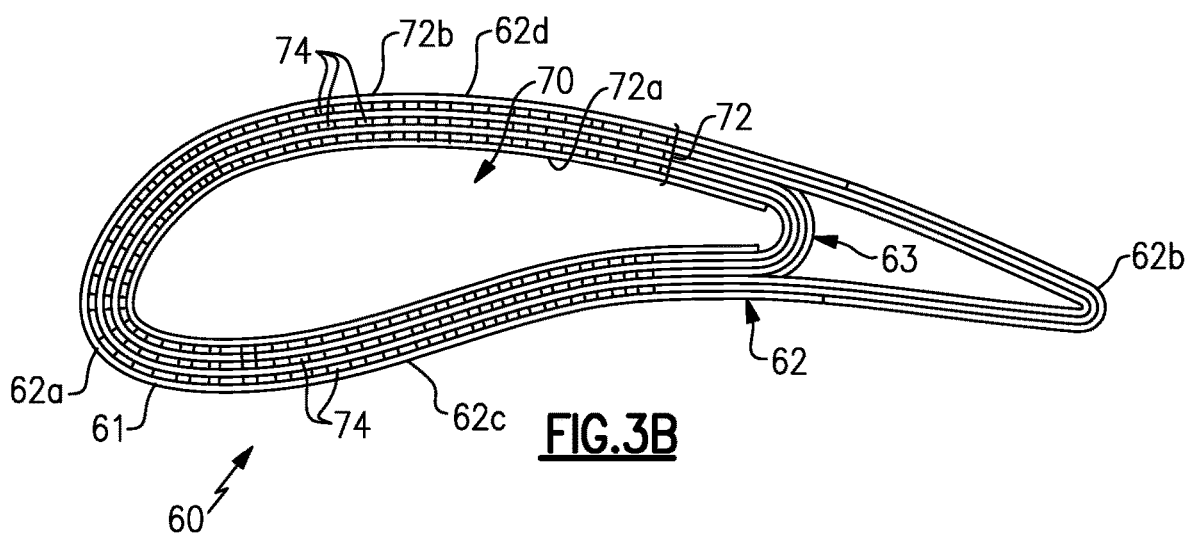
FIG. 3B illustrates another sectioned view of the airfoil.

FIGS. 3A and 3B show sectioned views through the airfoil section 62 of the airfoil 60, in which the layered structure of the CMC 71 is shown. The airfoil wall 61 includes a lay-up of CMC plies 72 that span the radially inner and outer ends 62e/62f. The CMC plies 72 include at least one inner-most CMC ply 72a (inner-most with regard to the cavity 70) that bounds at least a portion of the main cavity 70, at least one exterior skin CMC ply 72b, and intermediate CMC plies 72c located between the inner-most CMC ply 72a and the exterior skin CMC ply 72b. In this example, each of the inner-most CMC ply 72a and the exterior skin CMC ply 72b are double layers but could alternatively be single layers or have more than two layers. The exterior skin CMC ply 72b is continuous plies in that, except for cooling holes, it wraps uninterrupted from the trailing edge 62b on the first side 62c, through the leading edge 62a, and through the second side 62d to the trailing edge 62b on the second side 62d. The inner-most CMC ply 72a is also continuous but does not extend all the way to the trailing edge 62b and instead terminates due to a design feature, such as a fillet or radius 63 that partitions the cavity 70.

Figure 4:
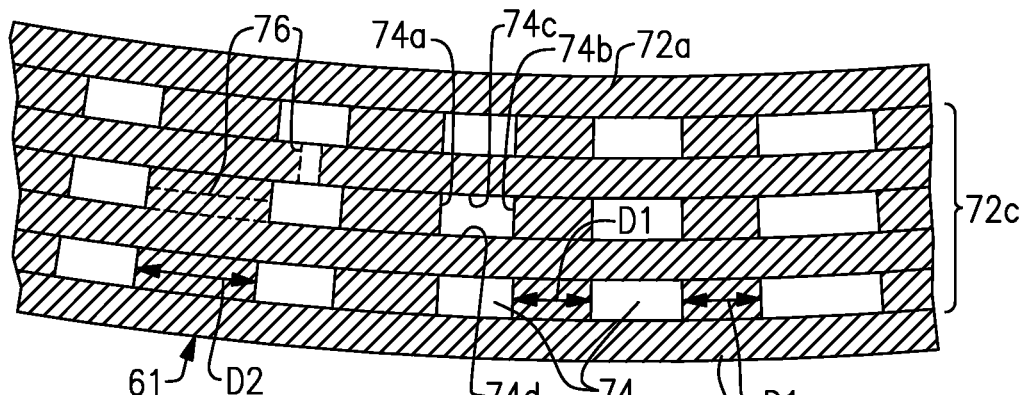
FIG. 4 illustrates a representative section of the airfoil wall.

A representative section of the airfoil wall 61 is shown in FIG. 4. As shown, at least one of the intermediate CMC plies 72c has cutout voids 74 that serve as cooling channels in the airfoil wall 61. The cutout voids 74 are strips that are elongated in the radial direction and span from the inner end 62e of the airfoil section 62 to the outer end 62f of the airfoil section 62. In this regard, the cooling channels may be fed with cooling air (e.g. compressor bleed air) for cooling the airfoil wall 61. As shown in FIG. 3B, the cutout voids 74, and thus the cooling channels, are located in the first (pressure) side 62c, the second (suction) side 62d, and the leading edge 62a. It is to be understood, however, that the presence and location of the cooling channels may be tailored to the cooling requirements of the particular airfoil design.

Each cooling channel is bound on lateral channel sides 74a/74b by the at least one of the intermediate CMC plies 72c, bound on an inner channel side 74c by a first adjacent one of the CMC plies 72 (e.g. either another of the intermediate CMC plies 72c, the inner-most CMC ply 72a, or the exterior skin CMC ply 72b), and bound on an outer channel side 74d by a second, different adjacent one of the CMC plies 72 (e.g. either another of the intermediate CMC plies 72c, the inner-most CMC ply 72a, or the exterior skin CMC ply 72b). In the illustrated example in FIG. 3B, two congruent ones of the intermediate CMC plies 72c have the cutout voids 74 such that the cooling channels have a thickness that is equal to two or more of the CMC plies 72. A thickness of two plies facilitates good flow and cooling. Alternatively, however, if cooling requirements permit, the cooling channels could have a thickness of one ply or more than two plies.

In the illustrated example, multiple ones of the intermediate CMC plies 72c have the cutout voids 74 such that the cooling channels form a three-dimensional cooling network. In this regard, the intermediate CMC plies 72c may also include connecting cutout voids 76 that fluidly connect the cooling channels. For instance, some connecting cutout voids 76 may be intra-connecting between cooling channels within an intermediate CMC ply 72c or set of plies, while other connecting cutout voids 76 may be inter-connecting between cooling channels in different intermediate CMC plies 72c or sets of plies. Alternatively, the connecting cutout voids 76 are excluded such that the cooling channels are non-interconnected.

Figure 5:
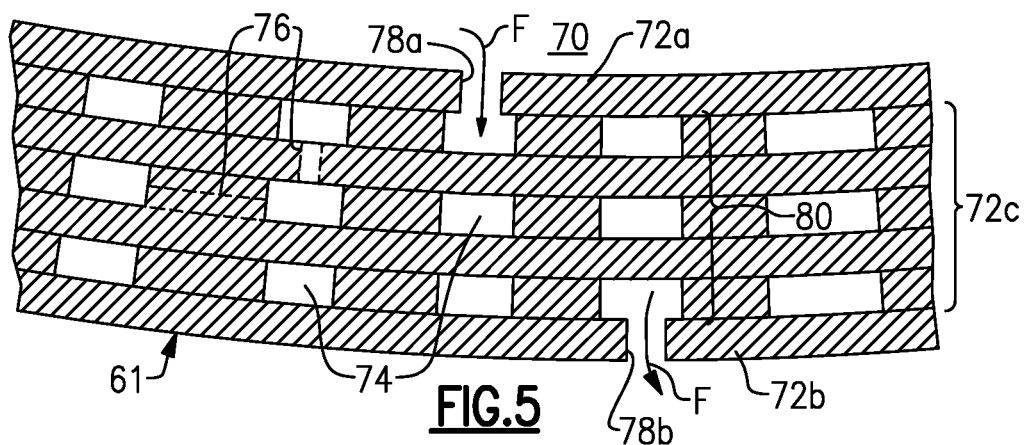
FIG. 5 illustrates another representative section of the airfoil wall, with inlet and outlet holes.

In a further example shown in FIG. 5, the inner-most CMC ply 72a of the airfoil wall 61 includes at least one inlet hole 78a connecting the cooling channels with the main cavity 70 and the exterior skin CMC ply 72b includes at least one outlet hole 78b connecting the cooling channels to the exterior of the airfoil 60 (i.e., the hot gas flow). In this configuration, the cooling air (shown by flow arrows F) may be provided from the main cavity 70 into the cooling channels via inlet hole 78a and then discharged into the gas path via outlet hole 78b.

Figure 6:
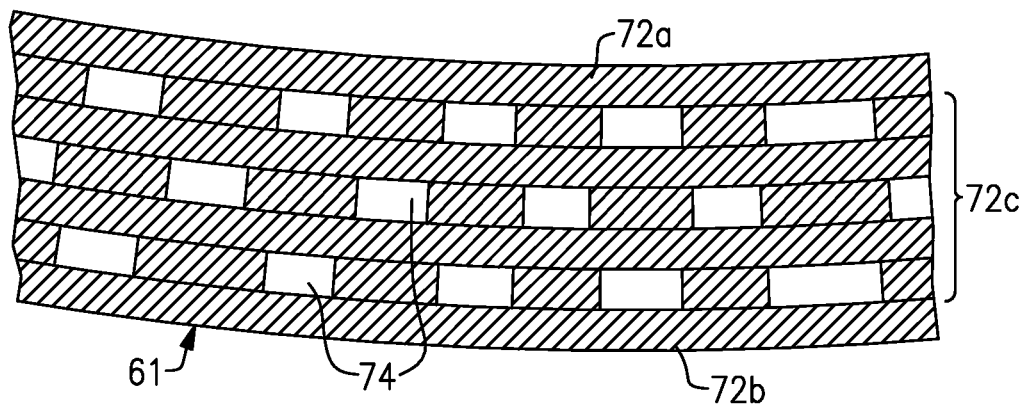
FIG. 6 illustrates another representative section of the airfoil wall, with staggered cooling channels.

The location, number, and spacing of the cooling channels may be tailored for the cooling requirements of the airfoil 60. In the example shown (e.g., FIG. 4), the cooling channels align in columns 80 in a thickness direction through the airfoil wall 61. Alternatively, in another example shown in FIG. 6, the cooling channels are staggered in a thickness direction through the airfoil wall. For instance, in the illustrated example there are three rows of cooling channels and the middle row of cooling channels is offset relative to the adjacent rows.

As also shown in FIG. 4, a portion of the cooling channels have a spacing D1 and another portion of the cooling channels have a larger spacing D2. The spacings D1 and D2 may be tailored for cooling requirements. In some instances, as shown, the cooling channels are non-uniformly spaced (i.e. have at least two non-equivalent spacings), while in other instances the cooling channels are uniformly spaced (i.e., all have equivalent spacings).

Figure 7:
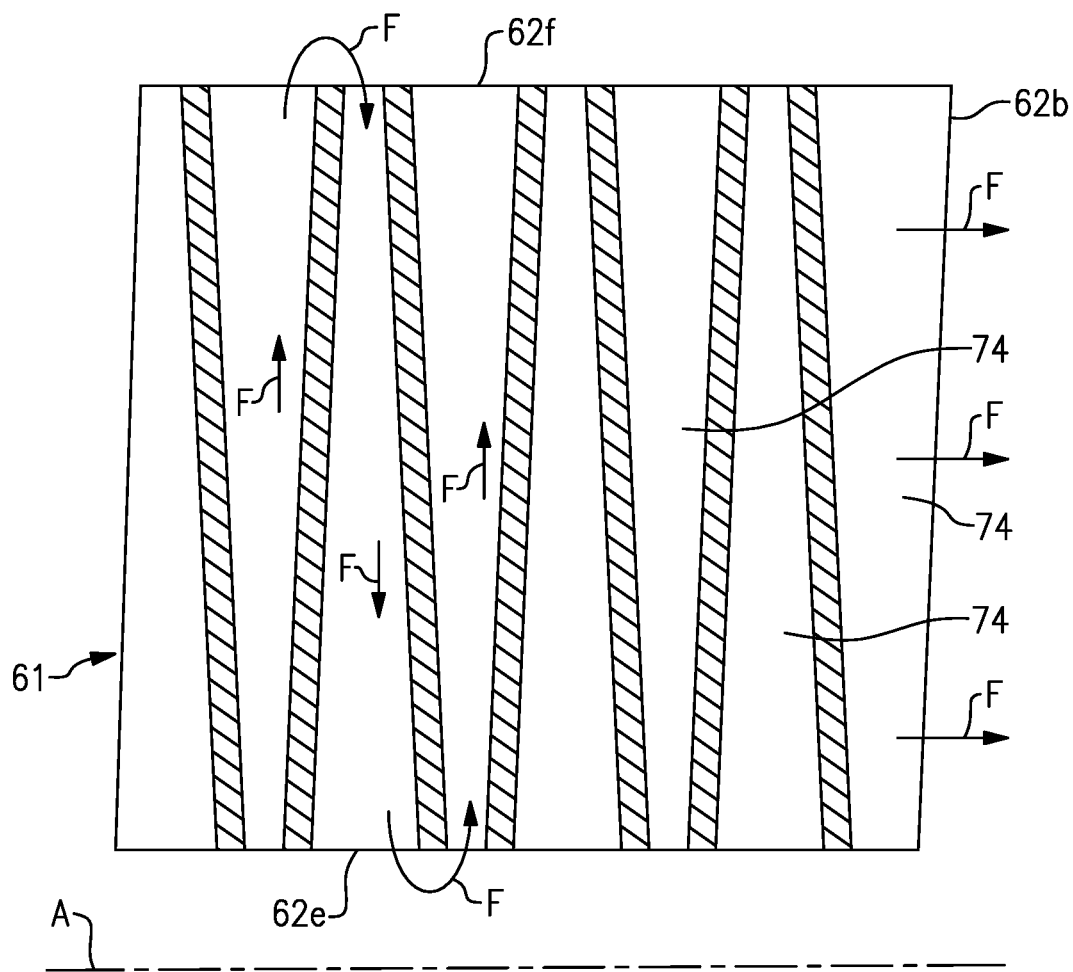
FIG. 7 illustrates a representation of the airfoil wall with tapered cooling channels.

In another example shown in FIG. 7, the cutout voids 74 are represented in their radial extent. The cutout voids 74, and thus the cooling channels, are tapered along the radial direction. For instance, the cooling channels alternate between tapering from the radially outer end 62f to the radially inner end 62e and tapering from the radially inner end 62e to the radially outer end 62f. Such a configuration may be useful in a serpentine flow pattern, where the cooling air flow up one channel and then turns to flow down the next channel before being discharged from the trailing edge 62b. As will be appreciated, the cutout voids 74 and channels need not be straight and could include other geometries, such as but not limited to, turns or curves.

Figure 8:
FIG. 8 depicts a method of fabricating an airfoil.
Figure 8:
Figure 8:
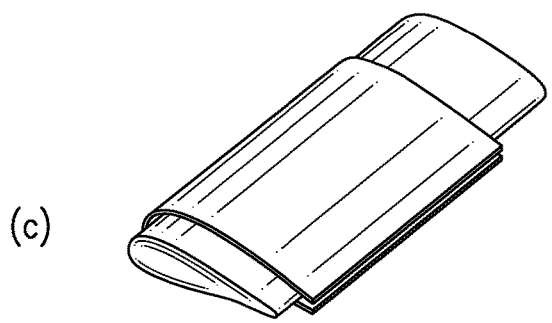
Figure 8:
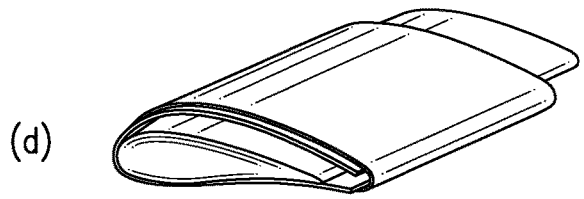
Figure 8:
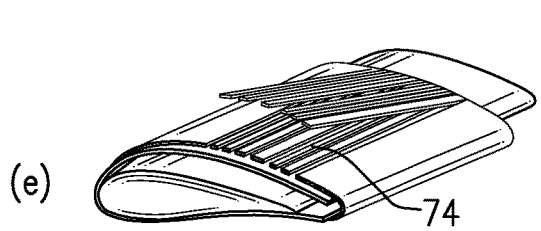
Figure 8:
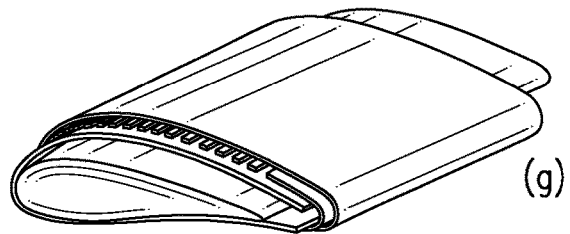
Figure 8:
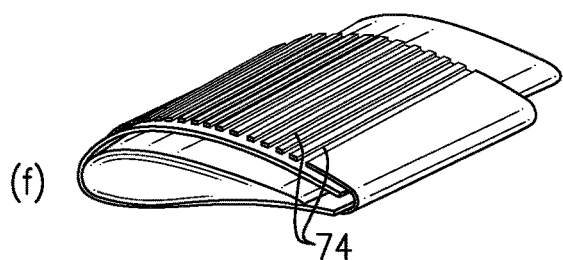
Figure 8:
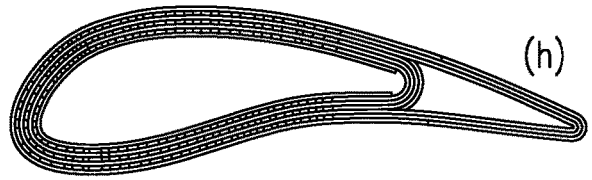

FIG. 8 depicts an example method for fabricating the airfoil 60. At step (a), two intermediate ceramic fabric plies are attached back-to-back. For example, the plies may be bonded together using an adhesive, such as polyvinyl alcohol polymer. The bonding facilitates keeping the plies aligned for subsequent steps. At step (b), strips are cut in the plies from step (a). As an example, laser-cutting may be used but other cutting techniques may alternatively be used. At step (c), at least one inner-most ceramic fabric ply is laid-up around a mandrel. For example, to make a double layer, two layers of ceramic fabric are wrapped around the mandrel. At step (d), the cut intermediate ceramic fabric plies from step (b) are laid-up on the inner-most ceramic fabric ply from step (c) and then at step (e) the cut strips are removed from the cut intermediate ceramic fabric plies, leaving cutout voids 74 as shown in illustration (f). At step (g), one or more continuous (uncut) intermediate ceramic fabric plies are laid-up on the intermediate ceramic fabric plies that have the cutout voids 74. Steps (a), (b), (d), (e), (f), and (g) may be repeated to lay-up additional intermediate ceramic fabric plies to a desired layer thickness and configuration of cooling channels. In the final iteration, the one or more continuous (uncut) ceramic fabric plies will be for the exterior skin ply. In this manner, the ceramic fabric plies are laid-up to provide an airfoil fiber preform. Finally, at step (h), the fiber preform is densified with the ceramic matrix material to form the airfoil wall 61. For example, the matrix material is deposited by chemical vapor infiltration, polymer infiltration and pyrolysis, or other method of matrix formation.

Alternatively, rather using steps (b)-(f), individual strips of the fabric could be cut and removed prior to being laid-up on the inner-most ceramic fabric ply, and then each individual strip could be laid-up on the inner-most ceramic fabric ply from illustration (c). In that case, the cutout voids 74 would be the negative space left between the strips. From the standpoint of time, however, laying-up individual strips may be more labor intensive. On the other hand, for strip geometries that are not straight or that are curved, laying-up individual strips may be desirable to enable adjustment of the locations of the strips.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. An airfoil comprising:
an airfoil wall circumscribing a main cavity and defining radially inner and outer ends, leading and trailing edges, and pressure and suction sides, the airfoil wall including a lay-up of ceramic matrix composite (CMC) plies spanning the radially inner and outer ends and having an inner-most CMC ply bounding at least a portion of the main cavity, an exterior skin CMC ply, and intermediate CMC plies between the inner-most CMC ply and the exterior skin CMC ply, at least one of the intermediate CMC plies having cutout voids that define cooling channels in the airfoil wall, the cooling channels being bound on lateral channel sides by the at least one of the intermediate CMC plies, bound on an inner channel side by a first adjacent one of the CMC plies, and bound on an outer channel side by a second, different adjacent one of the CMC plies, the cooling channels arranged in a plurality of rows, the plurality of rows including a first row adjacent the inner-most CMC ply, a second row adjacent the exterior skin CMC ply, and an intermediate row between the first and second rows in a thickness direction through the airfoil wall, the airfoil wall including intra-connection channels that connect the cooling channels in the intermediate row to each other, and inter-connection channels that connect the cooling channels in the intermediate row to the cooling channels in the second row.

2. The airfoil as recited in claim 1, wherein multiple ones of the intermediate CMC plies have the cutout voids such that the cooling channels form a three-dimensional cooling network.

3. The airfoil as recited in claim 1, wherein the cooling channels are tapered along a radial direction.

4. The airfoil as recited in claim 1, wherein two or more congruent ones of the intermediate CMC plies have the cutout voids such that the cooling channels have a thickness that is equal to two or more of the CMC plies.

5. The airfoil as recited in claim 1, wherein the cooling channels have a thickness and the CMC plies each have a ply thickness, and the thickness of the cooling channels is a multiple of the ply thickness.

6. The airfoil as recited in claim 1, wherein the cooling channels are located in the pressure side, the suction side, and the leading edge.

7. The airfoil as recited in claim 1, wherein the cooling channels are radially elongated.

8. The airfoil as recited in claim 1, wherein multiple ones of the intermediate CMC plies have cutout voids, and the cooling channels align in columns in a thickness direction through the airfoil wall.

9. The airfoil as recited in claim 1, wherein multiple ones of the intermediate CMC plies have cutout voids, and the cooling channels are staggered in a thickness direction through the airfoil wall.

10. The airfoil as recited in claim 1, wherein the inner-most CMC ply includes at least one inlet hole connecting the cooling channels with the main cavity.

11. The airfoil as recited in claim 10, wherein the exterior skin CMC ply includes at least one outlet hole connected with the cooling channels.

12. The airfoil as recited in claim 1, wherein the cooling channels are uniformly spaced apart.

13. The airfoil as recited in claim 1, wherein the cooling channels are non-uniformly spaced apart.

14. The airfoil as recited in claim 1, wherein the cooling channels of the first row are bound on inner channel side by the inner-most CMC ply and the cooling channels in the second row are bound on the outer channel side by the exterior skin CMC ply.

15. The airfoil as recited in claim 14, wherein the inner-most CMC ply includes at least one inlet hole connecting the cooling channels with the main cavity, and the exterior skin CMC ply includes at least one outlet hole connected with the cooling channels such that there is a flow path from the main cavity to the at least one outlet hole via the at least one inlet hole, the cooling channels, the intra-connection channels, and the inter-connection channels.

16. The airfoil as recited in claim 1, wherein the cooling channels are tapered along a radial direction and the cooling channels alternate between tapering from the radially outer end to the radially inner end and tapering from the radially inner end to the radially outer end.

17. A gas turbine engine comprising:
a compressor section;
a combustor in fluid communication with the compressor section; and
a turbine section in fluid communication with the combustor, the turbine section having a plurality of airfoils, each of the airfoils including
an airfoil wall circumscribing a main cavity and defining radially inner and outer ends, leading and trailing edges, and pressure and suction sides, the airfoil wall including a lay-up of ceramic matrix composite (CMC) plies spanning the radially inner and outer ends and having an inner-most CMC ply bounding at least a portion of the main cavity, an exterior skin CMC ply, and intermediate CMC plies between the inner-most CMC ply and the exterior skin CMC ply, at least one of the intermediate CMC plies having cutout voids that define cooling channels in the airfoil wall, the cooling channels being bound on lateral channel sides by the at least one of the intermediate CMC plies, bound on an inner channel side by a first adjacent one of the CMC plies, and bound on an outer channel side by a second, different adjacent one of the CMC plies, the cooling channels arranged in a plurality of rows, the plurality of rows including a first row adjacent the inner-most CMC ply, a second row adjacent the exterior skin CMC ply, and an intermediate row between the first and second rows in a thickness direction through the airfoil wall, the airfoil wall including intra-connection channels that connect the cooling channels in the intermediate row to each other, and inter-connection channels that connect the cooling channels in the intermediate row to the cooling channels in the second row.

18. The gas turbine engine as recited in claim 17, wherein the cooling channels have a thickness and the CMC plies each have a ply thickness, and the thickness of the cooling channels is a multiple of the ply thickness.

\* \* \* \* \*